(12) United States Patent
Metcalf et al.

(10) Patent No.: US 8,798,586 B2
(45) Date of Patent: Aug. 5, 2014

(54) APPARATUS, AND ASSOCIATED METHOD, FOR PROVIDING ENTERPRISE-CONTROLLED VOICE SERVICES TO WIRELESS DEVICES

(75) Inventors: Douglas Dean Metcalf, Riverton, UT (US); James Misasi, Waterloo (CA); David Lloyd Heit, Waterloo (CA); Ian J. McDonald, Waterloo (CA); Alan Tom Panezic, Mississauga (CA)

(73) Assignee: BlackBerry Limited, Waterloo (CA)

( * ) Notice: Subject to any disclaimer, the term of this patent is extended or adjusted under 35 U.S.C. 154(b) by 618 days.

(21) Appl. No.: 12/605,474

(22) Filed: Oct. 26, 2009

(65) Prior Publication Data
US 2010/0151841 A1   Jun. 17, 2010

Related U.S. Application Data

(60) Provisional application No. 61/109,817, filed on Oct. 30, 2008.

(51) Int. Cl.
*H04M 3/42* (2006.01)
*H04M 1/68* (2006.01)
*H04M 3/00* (2006.01)
*H04M 11/00* (2006.01)
*H04L 12/28* (2006.01)

(52) U.S. Cl.
USPC ........ 455/414.1; 455/411; 455/419; 455/406; 370/351; 379/211.02

(58) Field of Classification Search
USPC ................................... 455/414.1
See application file for complete search history.

(56) References Cited

U.S. PATENT DOCUMENTS

| | | | |
|---|---|---|---|
| 6,215,994 B1 | 4/2001 | Schmidt et al. | |
| 2005/0164693 A1* | 7/2005 | Yach et al. | 455/419 |
| 2005/0177622 A1* | 8/2005 | Spielman et al. | 709/206 |
| 2005/0228853 A1* | 10/2005 | Yamamura et al. | 709/200 |
| 2006/0067502 A1* | 3/2006 | Bamrah et al. | 379/211.02 |
| 2006/0116105 A1* | 6/2006 | Frankel et al. | 455/406 |
| 2006/0277408 A1* | 12/2006 | Bhat et al. | 713/173 |
| 2007/0094374 A1* | 4/2007 | Karia et al. | 709/223 |
| 2007/0206563 A1* | 9/2007 | Silver et al. | 370/351 |
| 2008/0200157 A1* | 8/2008 | Averbuch et al. | 455/416 |
| 2008/0207167 A1* | 8/2008 | Bugenhagen | 455/411 |
| 2009/0006116 A1* | 1/2009 | Baker et al. | 705/1 |

FOREIGN PATENT DOCUMENTS

| | | |
|---|---|---|
| EP | 1881665 A1 | 1/2008 |
| WO | 2004/054215 A1 | 6/2004 |

* cited by examiner

*Primary Examiner* — Timothy Pham
(74) *Attorney, Agent, or Firm* — Brett J. Slaney; Blake, Cassels & Graydon LLP

(57) ABSTRACT

An apparatus, and an associated methodology, provides control over operation of a voice-only, cellular mobile phone by an enterprise. An enterprise server provides selection of the operating capabilities of the voice-only wireless device. Once selected, the wireless device is caused to be provisioned to operate in conformity with the selected policy. Rather than sole control of the operational capability of the wireless device by a network operator, i.e., carrier, control of some operational capabilities of the device is carried out directly by enterprise personnel.

15 Claims, 3 Drawing Sheets

APPARATUS, AND ASSOCIATED METHOD, FOR PROVIDING ENTERPRISE-CONTROLLED VOICE SERVICES TO WIRELESS DEVICES

CROSS-REFERENCE TO RELATED APPLICATIONS

This application claims the priority of U.S. Provisional Application No. 61/109,817, filed Oct. 30, 2008, the content of which is incorporated in its entirety herein.

BACKGROUND OF THE DISCLOSURE

The present disclosure relates generally to a manner by which to manage the operation of wireless devices, such as cellular mobile phones, configured for voice-only service tiers.

Cellular, and other wireless, devices are used by many through which to communicate telephonically. With both falling communication costs and increasing communication capacities and availabilities, penetration levels of cellular, and other wireless, usage has approached, and sometimes even exceeds, that of conventional wire line communication devices. While wireless communications provides convenience to many, in some situations, wireless communication is the only manner by which the communications can be carried out. When, e.g., communications are to be carried out when positioned in a moving vehicle, communication by way of a wire line, communication device is not possible. For instance, drivers of fleet vehicles of an enterprise are sometimes provided with cellular, or other wireless, devices and utilize such devices to communicate telephonically with others, such as other personnel of the enterprise. The telephonic communications provide, e.g., a manner by which to convey enterprise-related information to, by, and with the drivers of the fleet vehicles.

Conventionally, devices of this sort communicate by way of a radio air interface with a communication network that is operated by a network operator, i.e., the carrier. Service subscriptions are purchased or payments are otherwise made to the network operator for access to communicate by way of the network. The network typically is formed of a plurality of fixed-site transceivers, each capable of communicating with a wireless device when the wireless device and fixed-site transceiver are positioned within communication range of one another. The communication network, sometimes referred to as a radio access network (RAN), is, in turn, connected to a core network, such as a PSTN (public switched telephonic network) or a data network, such as the internet. Communication end points are connectable, in turn, to the PSTN or data network. Thus, end-to-end communications are provided between the wireless device and a communication end point.

New-generation, wireless communication networks and systems provide for increasingly more data-intensive communication services. However, telephonic, i.e., voice communication, service remains, for many, the predominant use of a wireless device. Personnel of various enterprises, such as the exemplary enterprise, noted above, in which fleet drivers are provided with wireless devices, need not utilize wireless devices that permit users to utilize data-intensive communication services. Rather, in many applications, the wireless devices need only to be voice-capable, that is provide voice-only operation, howsoever defined.

The network operator, sometimes referred to herein as the carrier, conventionally provides the provisioning of, the wireless devices that communicate therethrough. More recently, at least one system has been developed and deployed utilizing data-capable, wireless devices that permit their managerial control by an enterprise entity of many of the control capabilities conventionally exerted only by the carrier.

To date, no corresponding, enterprise management is available for wireless devices used for voice-only services. Management of the voice-only devices by the enterprise rather than by the carrier would provide advantages with respect to the individualization of the control that could be provided at the enterprise level rather than by a carrier and also provide cost advantages.

If a manner could be provided by which to provide enterprise control of wireless devices used for voice-only services, improved enterprise oversight and management of the wireless devices would be permitted.

It is in light of this background information related to voice-only, wireless devices that the significant improvements of the present disclosure have evolved.

BRIEF SUMMARY

The present disclosure provides an apparatus, and an associated method, by which an enterprise controls the operational capabilities, and operation of, the wireless devices configured for voice-only service.

Personnel of the enterprise, rather than, or in addition to, a carrier operator, control the wireless-device capabilities for voice communications. Management of the wireless devices by the enterprise, rather than by a carrier operator, permits the wireless devices more easily to be operated in conformity with enterprise policies. Enterprise management of the devices also enhances security features of the devices and provides for enhanced device tracking and call control.

DETAILED DESCRIPTION

Figure 1:
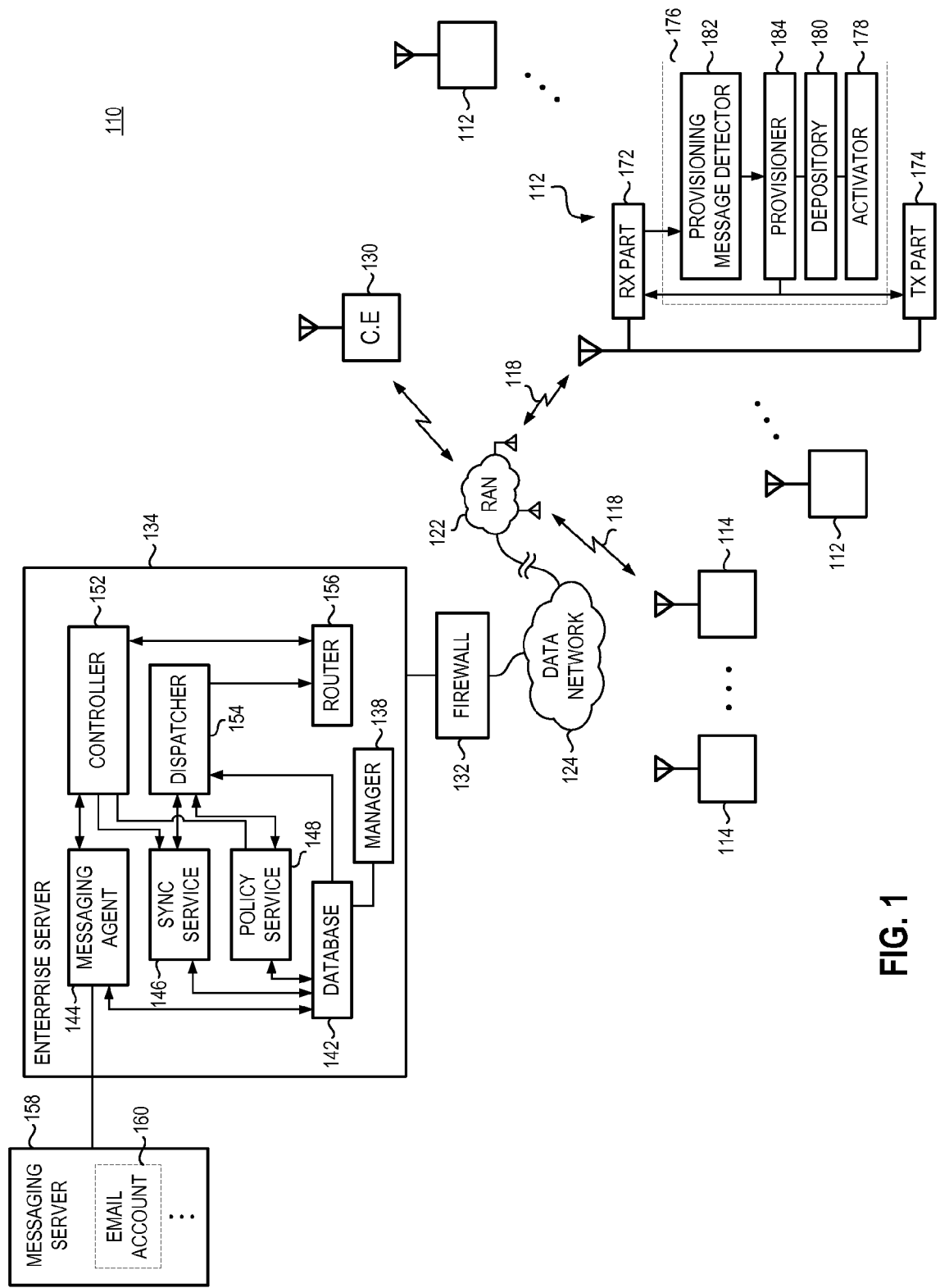
FIG. 1 illustrates a functional block diagram of an example communication system that includes an embodiment of the present disclosure.

The present disclosure, accordingly, advantageously provides an apparatus, and an associated method, by which to provide for business, or other, enterprise management of operation of voice-only wireless devices, such as cellular mobile phones that are used only for voice service pursuant to a voice-only service tier. The term "voice-only" as applied to services, service tiers, etc., is intended herein to refer to one service or a group of services, predominantly, but not necessarily exclusively directed to voice communication, including ordinary cellular or other wireless telephone calls, as distinguished from services or service tiers that are directed to, or have as significant components, more elaborate data or multimedia functionality, and are typically furnished in conjunction with high-capability wireless devices, such as "smart phones". Thus, for the purposes of this disclosure, a voice-only service tier could include, for example, the ability to send and receive text messages of limited length and complexity, such as "short message service" (SMS) messages, but would exclude more elaborate data and multimedia services.

The term "voice-only" as applied to a cell phone or other wireless device is intended to refer to such a device which is configured, provisioned or managed to furnish a voice-only tier of services, regardless of whether the device may inherently have capabilities to provide more elaborate data or multimedia services.

Through operation of an embodiment of the present disclosure, a manner is provided by which to control the operational capabilities, and operation of, wireless devices configured for voice-only service.

In one aspect of the present disclosure, a manager of an enterprise, via an enterprise server for voice services, rather than, or in addition to, a communication network operator, i.e., the carrier, controls the wireless-device capabilities for voice communications. Management of the wireless-device by an enterprise rather than an external entity, e.g., a carrier, permits improved, individualized control over the voice-only, wireless devices, in a cost-effective manner, to be provided. The enterprise management does not preclude carrier provisioning, and the wireless device can also be provisioned by the carrier.

In another aspect of the present disclosure, an enterprise organization that has a large and highly mobile workforce is better able to equip the workforce of the organization with voice-only cell phones, or other wireless devices, with a variety of voice service plans subsidized, in part or in their entirety, by the organization. Management of the wireless devices by an enterprise, rather than solely by a carrier, increases the capability of the organization to identify an organizational employee who abuses the wireless services furnished, and also facilitates the ability of the organization to associate all wireless devices with specific employees.

In another aspect of the present disclosure, remote diagnostics, control, logging, and management is facilitated. Increased productivity of organizational employees is facilitated while also reducing problems associated with lost wireless devices and help-desk support calls.

In another aspect of the present disclosure, an enterprise server is provided that is placed under the managerial control of the enterprise. The enterprise server controls and manages voice-only wireless devices of the enterprise. A voice-only, wireless device is a wireless device that is used for voice, telephonic services and, generally, is not used in manners requiring over-the-air capabilities pursuant to email, calendar or task organizing applications, internet access, or organizational intranet access. The enterprise server for voice services provides the capability to an enterprise administrator to manage wireless devices of users who require only voice services separately from users of wireless devices who have access to both voice and data-intensive, data services. Management and administration of the voice-only, wireless devices is provided by a focused set of tools using IT (information technology) policy rules, i.e., enterprise policy rules, for the administration of wireless-device-user accounts, the wireless devices, and server components in a voice-only environment.

In another aspect of the present disclosure, the enterprise server for voice services permits the enterprise to deploy voice-only mobile devices as managed and secured enterprise assets more efficiently, cost wise, than the deployment of data-capable, wireless devices that are activated with full carrier data plans.

In another aspect of the present disclosure, the enterprise server that manages voice services offers voice-centric management, control, and reporting features. Through the implementation of the enterprise server for voice services, enterprise-owned or subsidized, voice-only wireless devices are controlled by the enterprise policies. Enterprise management of the wireless devices also provides for asset, i.e., wireless-device, tracking, call reporting, call restrictions, password protection, as well as additional security functionalities.

By providing voice-centric policies, incoming and outgoing calls may be restricted to specific dialing patterns that selectably restrict incoming and outgoing long distance, international, or pay-for-use numbers. Additionally, call logging of calls made by the wireless devices identifying the date, time, calling or called party number, and duration of call is provided at the enterprise level by management facilities provided by the enterprise server for the voice-only services. By providing the enterprise-level server, central management at the enterprise of the voice-only, wireless devices is provided. Provisioning of the wireless devices, such as on a group basis, is provided. Selection is made by a selector of the enterprise server to provision, or withhold provisioning of, wireless devices. Withholding provisioning remotely disables or shuts down a wireless device. The enterprise server is also usable for wireless devices that have data capabilities. That is to say, wireless devices of the enterprise may include a first group of wireless devices operable at a first tier of service that provides voice-only capabilities, and a second group of wireless devices operable at a second tier of service that provides data services.

In these and other aspects, therefore, an example apparatus, and an associated example method, is provided for facilitating enterprise management of a first group of wireless devices configured to operate pursuant to a first voice service tier that provides voice service by way of an operator-managed network. An enterprise provisioning selector is configured to select when to provision a wireless device of the first group. A provisioning controller is operable responsive to selection by the enterprise provisioning selector. The provisioning controller is configured to cause provisioning of a wireless device of the first group with a policy that defines wireless-device voice service capabilities.

In these and further aspects, a further example apparatus, and an associated example method, is provided for a wireless device of a first enterprise-managed group of wireless devices. The devices are configured to operate pursuant to a first voice service tier that provides voice service. A provisioning message detector is configured to detect an enterprise-originated provisioning message that identifies a policy defining a selected voice service capability to be provided to the wireless device. A provisioner is configured to provision the wireless device to operate in conformity with the voice service capability identified in the provisioning message.

Turning first, therefore, to FIG. 1, a communication system, shown generally at 110, includes a plurality of wireless devices 112 and 114. The wireless devices 112 form a first group of wireless devices, and the wireless devices 114 form a second group of wireless devices. Additional groups of wireless devices can analogously be represented. The first group of wireless devices is representative of devices that are to be operated pursuant to a first, voice-only service tier. And, the second group of wireless devices is representative of devices that are to be operated pursuant to a second service tier.

The wireless devices, when appropriately provisioned, are capable of communicating by way of a radio air interface 118 with a wireless telecommunications network 122. Wireless network 122 may be, for example but without limitation, a cellular, PCS or similar mobile telephone or wireless telecommunications network. The network 122, in the example implementation, together with the wireless devices 112 and 114, are operable in general conformity with the operating protocols and signaling of an operating specification of a cellular telecommunications system, such as GSM, CDMA, EDGE, or the like and typically incorporates a Radio Access Network (RAN). In other implementations, the network and the wireless devices are operable in conformity with other types of communication-system protocols. The wireless network 122 and its operator shall also, at times, be referred to as a carrier.

A communication end point (C.E.) 130, is positioned in communication connectivity with the network 122. While here illustrated to be a mobile device, the communication endpoint is representative of any telephone station including a PSTN-connected (Public Switched Telephone Network-connected) telephone station.

The wireless network 122 is connected to a data network 124 which provides data transport between the wireless network 122 and one or more facilities of an enterprise. Data network 124 may be implemented using any one or a combination of privately-owned facilities, switched or dedicated facilities furnished by a common carrier or other provider, the public Internet, and the like, and may include virtual networks overlaid on any of these, and any number of intermediate facilities, network, or providers. Apparatus of an enterprise facility is connected to the data network 124, here protected by way of an optional firewall 132. And, here, specifically, the enterprise facility includes an enterprise server that includes the apparatus 134 of an embodiment of the present disclosure. The elements of the apparatus 134 are functionally represented, implementable in any desired manner, including by algorithms executable by processing circuitry, hardware elements, or combinations thereof. In one embodiment, the elements of apparatus 134 are implemented as one or more commercially-available server computers running a commercially available operating system, along with appropriate applications and support software to provide the functionality of apparatus 134 as further described. By way of non-limiting example, the server computers may be computers having IA-32-compatible processors, appropriate memory, file storage, and other peripheral devices operatively coupled thereto, and may run the MICROSOFT WINDOWS 2003 operating system and an SQL-compatible database. Other appropriate commercially-available computer technology could also be used. Apparatus 134 may further include appropriate router, switch, and other interconnecting technologies as is known in the art. The apparatus 134, pursuant to an embodiment of the present disclosure, controls aspects of operation of the wireless devices 112 of the first group. The control provided by the apparatus 134 may include control aspects that conventionally are performed, or provided, by the operator wireless network 122. The wireless devices 112 here are voice-only devices, as hereinbefore defined. While the devices 112 may inherently possess capabilities to furnish more elaborate data and multimedia services, the enterprise provisions the devices to permit their use solely for voice-only services. The voice-only services, as noted previously, might also include limited data services, such as SMS message services.

The apparatus 134 formed of the enterprise server is here shown to include a manager 138, a configuration database 142, a messaging agent 144, a synchronization service 146, a policy service 148, a controller 152, a dispatcher 154, and a router 156. A messaging server 158 that provides for messaging services associated with email accounts. The messaging server 158 may be any suitable messaging server or mail transport agent, such as a messaging server conforming to the IMAP protocol. Other messaging servers and protocols e.g., MAPI, POP3, and the like, could also be used. Messaging server 158 provides at least one email account, such as here, email account 160 that here defines a single IMAP mailbox, associated with all of the devices 112 of the first group.

In operation, the apparatus 134 may operate to activate a wireless device 112 to operate pursuant to voice-only services. The apparatus may be further used to disable operation of a wireless device as well as, also, to provision the wireless device to operate in conformity with enterprise policies.

The manager 138 operates to receive, such as by way of input information provided to the enterprise server, information related to each wireless device 112. The information includes, for instance, the identity of a wireless device which may include a unique insignia, such as a PIN (personal identification number). The manager 138 causes such information to be stored at the configuration database 142. The manager 138 also operates to assign a password to each of the wireless devices 112 of the group. The database information is accessible by the messaging agent, the synchronization service 146, the policy service 148, and the dispatcher 154. And, once stored, the apparatus 134 formed of the enterprise server is configured to provide for the activation of a wireless device 112, its deactivation, and its operation in conformity with the policy rules of the enterprise. The policy rules are provided by the policy service 148. The enterprise policies may define any controllable aspect of communications of a wireless device, and may vary from device to device and user to user, depending optionally in part on the role the user occupies within the organization or on other factors. In one implementation, separate policies are defined for different groups of wireless devices. The policies are started at the database 142. As user information is added to the database regarding a wireless device, a policy is also associated with the wireless device. Pursuant to subsequent activation of a device, the device receives the policy and operates in conformity with the provided policy. Changes to the service capabilities permitted of the wireless device can subsequently be made. Such changes are made, e.g., by pushing the new policy to the wireless device or by waiting for the policy server to recognize that the policy has changed, and then provided the policy to the wireless device. Additionally, by placing the wireless devices under enterprise management, the enterprise manager is able to collect and report usage of the wireless device and collect additional statistics with greater detail and precision that would otherwise be permitted.

The policies, for instance, may operate to place call restrictions on calls placed by, or placed to, the wireless devices. Specific dialing patterns, if desired, are restricted to limit incoming or outgoing long distance calls, international calls, or pay-for-use calls. Additionally, control is effectuated, if desired, to perform call logging of calls that are placed to identify the date and time of the call, the calling or called party number, and the duration of the call. Additional security settings, such as the password protection, as well as other configurable security framework constructs are also controlled by the enterprise apparatus. Control effectuations, conventionally only provided by the network operator of the wireless network, are provided by the enterprise, permitting costs savings and better individualization of control.

The wireless devices include transceiver circuitry, here represented by a receive part 172 and a transmit part 174 at an example wireless device. The wireless devices also include apparatus 176 of an embodiment of the present disclosure. The apparatus 176 is also functionally represented, implementable in any desired manner, including, for instance, algorithms executable by processing circuitry, hardware elements, and combinations thereof. Here, the apparatus includes an enterprise activator 178, a policy depository 180, a message detector 182, and a provisioner 184.

A wireless device is activated, here through user initiation by way of the enterprise activator 178. The enterprise activator includes an enterprise activation screen viewable by a user of the device on a user interface (not shown). The user enters an IMAIP address, i.e., the address associated with the email account 160. A password is also entered by the user. The password corresponds to a password associated by the manager with the wireless device and stored at the database 142. Once entered, an email is caused to be sent by the transmit part 174 and is routed to the IMAP messaging server, and, e.g., to the IMAP account associated with the address.

The messaging agent 144 of the enterprise server polls the messaging server 158. And, once the message is received at the messaging server, the messaging agent retrieves the message out of the IMAP mailbox. The controller 152 causes synchronization operations to be performed, here using the synchronization service 146 to synchronize the affected wireless device with the server. And, information is retrieved from the database 142 that provides for the generation of an encryption key that is exchanged with an encryption key of the wireless device. And, then, the enterprise policy, provided by the policy service 148, is sent to the wireless device.

At the wireless device, the detector 182 detects delivery of the policy, and the policy is caused to be stored at the policy depository. The provisioner 184 provisions the wireless device and causes its operation in conformity with the enterprise policy.

Any type of provisioning control is effectuated, including, e.g., to enable or disable voice service capability of the wireless device. If, for instance, the device is reported to be missing, the enterprise server sends a message to the wireless device to, e.g., lock its operation to prevent use of the device or to cause erasure of all proprietary information from the device. Data-sending capabilities of the enterprise server and data-sending and -receiving capabilities of the wireless devices are utilized to control, by the enterprise, the voice-service capabilities of the wireless device. Control previously necessitating interaction by a carrier operator is obviated. The data services are incidental to control exerted by the enterprise and are generally not available to a user of a wireless device.

The wireless devices 114 of the second group are representative of wireless devices that are configured to operate pursuant to a second tier of service, different than a first tier of service pursuant to which the wireless devices 112 are provisioned. The second tier comprises, e.g., different voice capabilities or comprises data capabilities. A second tier of service, e.g., also provides voice services as well as, additionally, character-limited text message services, such as SMS (Short Message Service), and possibly, more elaborate data or multi-media services. A separate policy is assigned to the wireless devices of the second group by assigning a separate policy to the second group. In one embodiment, the server 134 also controls the operation of the second group. In another embodiment, separate enterprise servers are utilized.

Figure 2:
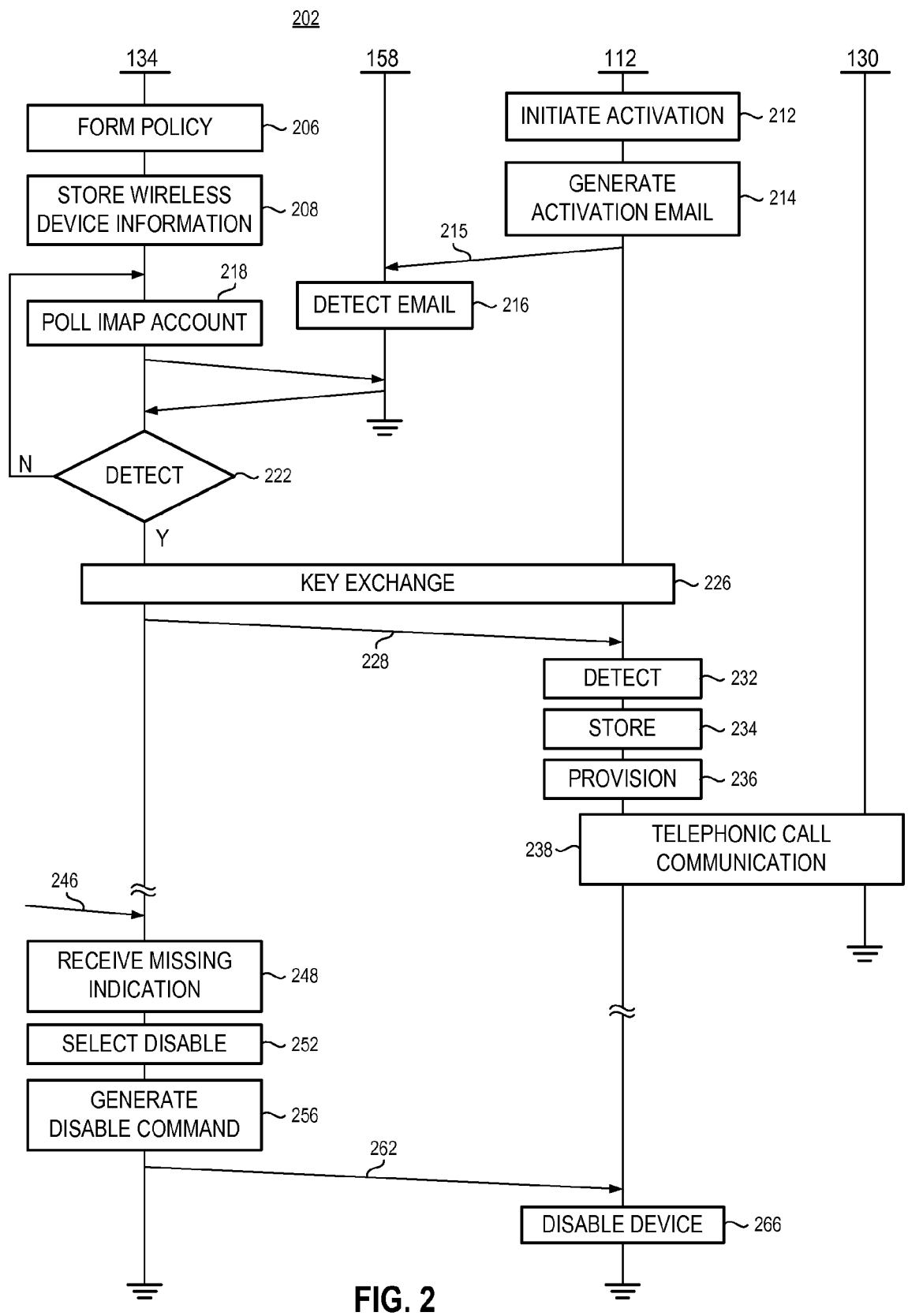
FIG. 2 illustrates a signaling diagram representative of example signaling processes generated pursuant to operation of an embodiment of the present disclosure.

Turning next to FIG. 2, an example signaling sequence diagram, shown generally at 202, is representative of example apparatus operation and signaling generated pursuant to operation of an embodiment of the present disclosure. In operation, personnel of a business, or other, enterprise, by way of an enterprise server 134 control voice-only, wireless devices 112 of a group of wireless devices, such as voice-only cellular mobile phones. Wireless devices are, e.g., used by employees of the enterprise pursuant to their enterprise activities.

Here, enterprise policy rules are formed, indicated by the block 206. The policy rules include rules, e.g., that establish operating rules that define calls that are permitted to be placed by, or terminated at, the wireless device. The policy rules form the enterprise policy pursuant to which wireless devices of the voice-only service shall be operable.

Also, and as indicated by the block 208, wireless-device-related information is provided and stored at an enterprise database.

At the wireless device, and as indicated by the block 212, a user of the wireless device initiates activation of the device. An email message is generated, indicated by the block 214, and caused to be sent, indicated by the segment 215. The email is delivered to, and detected by, indicated by the block 216, the messaging server.

The enterprise server 134 monitors the messaging server by polling, indicated by the block 218, the email account. A determination, indicated by the decision block 222, is made as to whether a wireless-device message has been delivered to the account. If not, the no branch is taken, and polling continues. Here, because a message has been sent and received, detection is in the affirmative, and the yes branch is taken. The server causes key exchange and authentication procedures to be carried out, indicated by the block 226, with the wireless device. And, then, enterprise policies and service books are sent, indicated by the segment 228, to the wireless device. The policy is detected, indicated by the block 232, stored, indicated by the block 234, and the device is provisioned, indicated by the block 236, to operate in conformity with the policies, and data synchronization is performed (not separately illustrated). Here, voice-only communications are permitted with other devices. From time to time, a communication connection may be formed with the communication endpoint 130, as indicated by the block 238. This communication connection may occur asynchronously, e.g., at a later time.

The signaling diagram further represents an example scenario in which a wireless device 112 whose operation is managed and controlled by the enterprise server 134. Here, the wireless device is reported, indicated by the segment 246, to be missing. The report is received by personnel of the enterprise, and the report is provided to, and received at, indicated by the block 248, the enterprise server. In response, selection is made, here indicated by the block 252, to disable the missing wireless device. Disabling commands are generated by the enterprise server, indicated by the block 256, sent, indicated by the segment 262, and detected, indicated by the block 266, at the wireless device. The communication capability of the wireless device is disabled. Unauthorized operation of the wireless device is thereafter prevented.

Figure 3:
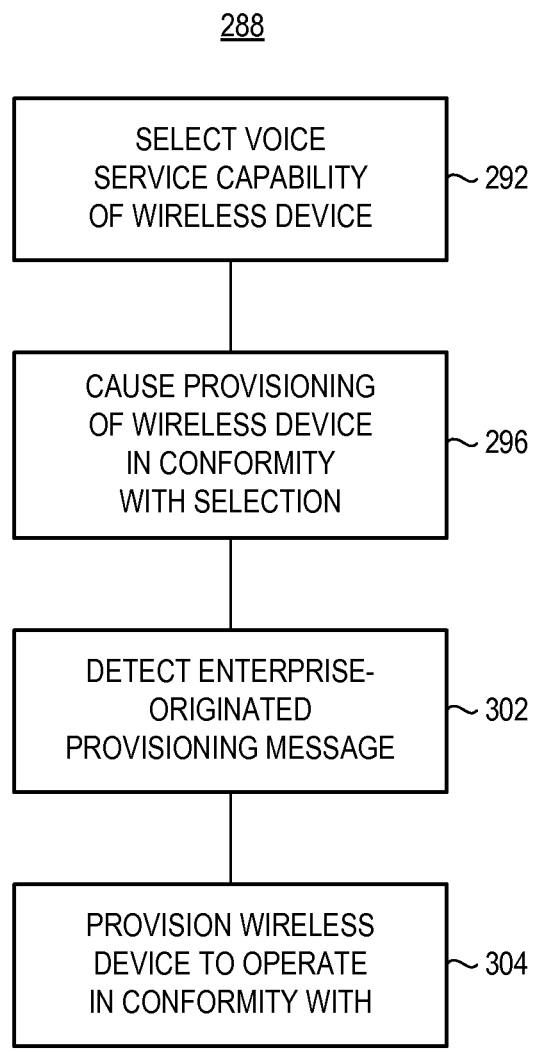
FIG. 3 illustrates a method flow diagram representative of an example method of operation of an embodiment of the present disclosure.

FIG. 3 illustrates an example method flow diagram, shown generally at 288, representative of a method of operation of an embodiment of the present disclosure. The method facilitates enterprise management of a first group of wireless devices configured to operate pursuant to a first voice service tier that provides voice service by way of an operator-managed network.

First, and as indicated by the block 292, a voice service capability of one or more wireless devices of the first group is selected. Then, and as indicated by the block 296, provisioning of the wireless devices of the first group with voice service capabilities responsive to the selection is caused.

At the wireless device, an enterprise-originated provisioning message is detected, indicated by the block 302. The message identifies a selected voice service capability to be provided to the wireless device. Then, and as indicated by the block 304, the wireless device is provisioned to operate in conformity with the voice service capability identified in the provisioning message.

Thereby, managerial control over the operational capabilities and operation of the wireless devices of the enterprises are provided directly by the enterprise. While aspects of the mobile-device operation are also controllable by the carrier, control at the enterprise level facilitates usage of the wireless devices in conformity with an enterprise policy. Security features are also enhanced through control provided directly by the enterprise.

Presently preferred embodiments of the disclosure and many of its improvements and advantages have been described with a degree of particularity. The description is of preferred examples of implementing the disclosure and the description of preferred examples is not necessarily intended to limit the scope of the disclosure. The scope of the disclosure is defined by the following claims.

What is claimed is:

1. An enterprise managed server for voice services for facilitating enterprise management of wireless devices obtaining wireless service by way of a cellular telecommunications system network operator, said enterprise managed server comprising:
   an enterprise provisioning selector configured to select when to provision a wireless device of a group of wireless devices to operate pursuant to a voice-only service tier permitting voice-only services in conformity with an enterprise policy; and
   a provisioning controller configured, responsive to selection by said enterprise provisioning selector, to cause transmission of an enterprise-originated provisioning message to the wireless device that identifies the enterprise policy that permits the voice-only services, thereby provisioning the wireless device with the enterprise policy for restricting the wireless device to the voice-only services.

2. The enterprise managed server of claim 1 further comprising a mailbox identified by a mailbox identity and wherein the wireless devices of the group of wireless devices are all associated with the mailbox.

3. The enterprise managed server of claim 2 wherein said enterprise provisioning selector is configured to monitor the mailbox for an activation request.

4. The enterprise managed server of claim 3 wherein said activation request is in the form of an email from the wireless device.

5. The enterprise managed server of claim 1 wherein said provisioning controller is further configured to utilize data service capabilities of the wireless device to cause said provisioning.

6. The enterprise managed server of claim 5 wherein data service capabilities of the wireless device, which are incidental to said provisioning, are substantially unavailable to a user of the wireless device.

7. The enterprise managed server of claim 1 wherein said provisioning controller is further configured to cause wireless-device call logging.

8. The enterprise managed server of claim 1 wherein said provisioning controller is further configured to cause wireless-device activation.

9. A method for managing wireless devices, which obtain wireless service by way of a cellular telecommunications system network operator, using an enterprise managed server for voice services, said method comprising:
   associating wireless devices to a service tier, wherein the service tier is a voice-only service tier that permits voice-only services in conformity with an enterprise policy;
   causing transmission of an enterprise-originated provisioning message to the wireless device that identifies an enterprise policy that permits the voice-only services, thereby provisioning the wireless devices associated with the service tier to operate in conformity with the enterprise policy for restricting the wireless devices to said voice-only services.

10. The method of claim 9 wherein said associating further comprises detecting delivery of a wireless-device request for provisioning.

11. The method of claim 9 wherein the enterprise policy is controlled by personnel of an enterprise.

12. The method of claim 11 wherein said voice-only services further comprises a character-limited message capability.

13. The method of claim 12 wherein said detecting comprises detecting an activation request in the form of an email from the wireless device and sending a provisioning message to the wireless device to restrict the wireless device to said voice-only services.

14. A wireless device managed by an enterprise and obtaining wireless service by way of a cellular telecommunications system network operator, said wireless device comprising:
   a provisioning message detector configured to detect an enterprise-originated provisioning message sent by the enterprise that identifies an enterprise policy that permits voice-only services in conformity with the enterprise policy; and
   a provisioner configured to provision the wireless device to operate in conformity with the voice-only services.

15. A method for facilitating operation of a wireless device managed by an enterprise and obtaining wireless service by way of a cellular telecommunications system network operator, said method comprising:
   detecting an enterprise-originated provisioning message sent by the enterprise to the wireless device that identifies an enterprise policy that permits voice-only services in conformity with the enterprise policy; and
   provisioning the wireless device to operate in conformity with the enterprise policy that permits the voice-only services identified in the provisioning message.

* * * * *